United States Patent
Kudo (10) Patent No.: US 8,885,294 B2
(45) Date of Patent: Nov. 11, 2014

(54) HEAD GIMBAL ASSEMBLY AND DISK DEVICE WITH THE SAME

(71) Applicant: Kabushiki Kaisha Toshiba, Tokyo (JP)

(72) Inventor: Masaya Kudo, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/101,003

(22) Filed: Dec. 9, 2013

(65) Prior Publication Data

US 2014/0168815 A1  Jun. 19, 2014

Related U.S. Application Data

(63) Continuation-in-part of application No. 13/901,456, filed on May 23, 2013.

(30) Foreign Application Priority Data

Dec. 18, 2012 (JP) .................................. 2012-275548
Oct. 25, 2013 (JP) .................................. 2013-222322

(51) Int. Cl.
  *G11B 21/21* (2006.01)
(52) U.S. Cl.
  USPC ...................................................... 360/99.08
(58) Field of Classification Search
  USPC ...................................................... 360/99.08
  See application file for complete search history.

(56) References Cited

U.S. PATENT DOCUMENTS

| 6,532,138 B1 | 3/2003 | Koganezawa | |
|---|---|---|---|
| 6,760,196 B1* | 7/2004 | Niu et al. | 360/294.6 |
| 8,289,654 B2 | 10/2012 | Kuwajima | |
| 8,446,694 B1* | 5/2013 | Tian et al. | 360/245 |
| 8,570,688 B1* | 10/2013 | Hahn et al. | 360/294.4 |
| 8,593,764 B1* | 11/2013 | Tian et al. | 360/245.4 |
| 8,593,765 B2* | 11/2013 | Uematsu et al. | 360/294.4 |
| 2004/0189191 A1 | 9/2004 | Ohshita et al. | |

FOREIGN PATENT DOCUMENTS

| JP | 2001-043641 A | 2/2001 |
|---|---|---|
| JP | 2004-318971 A | 11/2004 |
| JP | 2004-348971 A | 12/2004 |
| JP | 2011-076656 A | 4/2011 |
| JP | 2011-138596 A | 7/2011 |

OTHER PUBLICATIONS

U.S. Appl. No. 13/901,456, filed May 23, 2013, Kudo.

* cited by examiner

*Primary Examiner* — Mark Blouin
(74) *Attorney, Agent, or Firm* — Knobbe Martens Olson & Bear LLP (57) ABSTRACT

According to one embodiment, a head gimbal assembly includes a load beam, a base plate fixed to a proximal-end portion of the load beam, a flexure attached to the load beam and the base plate, a gimbal portion formed of a distal-end portion of the flexure positioned on a distal-end portion of the load beam, a magnetic head attached to the gimbal portion, and electrically connected to the traces of the flexure, a concave portion formed in the gimbal portion, and concaved toward the thin metallic plate side, and a piezoelectric element arranged in the concave portion, fixed on a bottom of the concave portion, and configured to expand/contract in a longitudinal direction of the flexure by application of a voltage thereto.

20 Claims, 6 Drawing Sheets

HEAD GIMBAL ASSEMBLY AND DISK DEVICE WITH THE SAME

CROSS REFERENCE TO RELATED APPLICATIONS

This application is a Continuation-in-Part Application of U.S. patent application Ser. No. 13/901,456, filed May 23, 2013 and based upon and claiming the benefit of priority from Japanese Patent Applications No. 2012-275548, filed Dec. 18, 2012; and No. 2013-222322, filed Oct. 25, 2013, the entire contents of all of which are incorporated herein by reference.

FIELD

Embodiments described herein relate generally to a head gimbal assembly to be used in a disk device, and disk device provided with the head gimbal assembly.

BACKGROUND

In recent years, disk devices such as magnetic disk drives, and optical disk drives are widely used as external recording devices or image recording devices of computers.

A disk device, for example, a magnetic disk drive is generally provided with a magnetic disk arranged in a casing, spindle motor configured to support and rotationally drive the magnetic disk, and head gimbal assembly (HGA) supporting a magnetic head. The head gimbal assembly includes a suspension attached to a distal-end portion of an arm, flexure (conductive trace member) provided on the suspension, and drawn out from the suspension, and a magnetic head supported on the suspension through a gimbal-portion of the flexure. Traces of the flexure are electrically connected to the magnetic head. Further, the suspension includes a load beam, and base plate fixed to a proximal end of the load beam. The base plate is fixed to the distal-end portion of the arm.

In recent years, there is proposed an HGA in which a thin-film piezoelectric (PZT) element is mounted on the gimbal-portion of a flexure, and infinitesimal displacement of the magnetic head in the seek direction is created by the expansion/contraction motion of the piezoelectric element. According to the HGA, it becomes possible to control an operation of the magnetic head by controlling a voltage to be applied to the piezoelectric element.

However, in the HGA described above, when the piezoelectric element is expanded or contracted by voltage application, the piezoelectric element is bent in the thickness direction thereof. Accordingly, part of the expansion or contraction of the piezoelectric element escapes in the direction in which the piezoelectric element is bent, and the displacement of the magnetic head is reduced. Thereby, it becomes difficult to obtain a displacement control amount of the magnetic head corresponding to the displacement amount of the piezoelectric element. In order to obtain the desired displacement control amount, a piezoelectric element of a greater size is required, and hence problems are caused in terms of the manufacturing cost and size reduction of the HGA.

DETAILED DESCRIPTION

Various embodiments will be described hereinafter with reference to the accompanying drawings. In general, according to one embodiment, a head gimbal assembly comprises: a load beam; a base plate fixed to a proximal-end portion of the load beam; a flexure comprising a thin metallic plate, an insulating layer on the thin metallic plate, and a conductive layer on the insulating layer and including a plurality of traces, the flexure being an elongate belt-shape and attached to the load beam and the base plate at the thin metallic plate side thereof; a gimbal portion formed of a distal-end portion of the flexure positioned on a distal-end portion of the load beam; a magnetic head attached to the gimbal portion, and electrically connected to the traces of the flexure; a concave portion formed in the gimbal portion, and concaved toward the thin metallic plate side; and a piezoelectric element arranged in the concave portion, fixed on a bottom of the concave portion, and configured to expand and to contract in a longitudinal direction of the flexure by application of a voltage thereto.

First Embodiment

Figure 1:
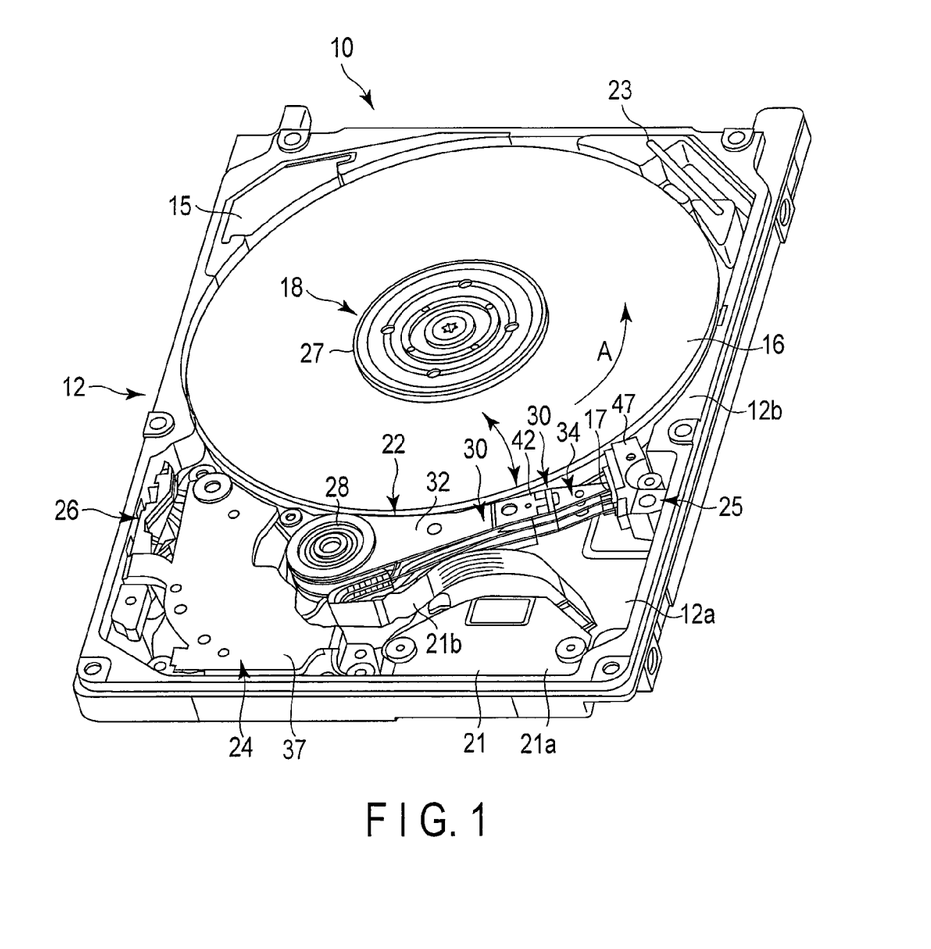
FIG. 1 is a perspective view showing a hard disk drive (HDD) according to a first embodiment.

FIG. 1 shows an internal structure of an HDD with a top cover removed. As shown in FIG. 1, the HDD comprises a housing 10. The housing 10 comprises a base 12 with a rectangular box-like shape opened at a top surface thereof, and top cover (not shown) to be fastened to the base 12 by means of a plurality of screws, and configured to close the upper end opening of the base 12. The base 12 includes a rectangular bottom wall 12a, and sidewall 12b provided along the periphery of the bottom wall in a standing manner.

Two magnetic disks 16 serving as recording medium, and a spindle motor 18 serving as a drive section configured to support and rotate the magnetic disks are provided in the housing 10. The spindle motor 18 is provided on the bottom wall 12a. Each of the magnetic disks 16 has a diameter of, for example, 65 mm (2.5 inches), and includes a magnetic recording layer on each of upper and lower surfaces. The magnetic disks 16 are coaxially fitted on a hub (not shown) of the spindle motor 18, and are clamped by a clamp spring 27 to be fixed to the hub. Thereby, the magnetic disks 16 are supported in parallel to the bottom wall 12a of the base 12. The magnetic disks 16 are rotated by the spindle motor 18 at a predetermined rotational speed.

In the housing are provided a plurality of magnetic heads 17 configured to carry out recording or reproduction of information with respect to the magnetic disks 16, and a head stack assembly (HSA) 22 configured to support the magnetic heads to be movable with respect to the magnetic disks 16. Further, the HDD comprises a voice coil motor (VCM) 24 configured to rotate and position the HSA 22, ramp load mechanism 25 configured to, when the magnetic head 17 moves to the outermost position of the magnetic disk 16, hold the magnetic head at an unload position separate from the magnetic disk, latch mechanism 26 configured to, when an impact or the like is applied to the HDD, hold the HSA at a retraction position, and board unit 21 including a preamplifier, and the like, which are disposed in the housing 10. It should be noted that the latch mechanism 26 is not necessarily limited to a mechanical one, and a magnetic latch may also be used.

A printed circuit board (not shown) is fastened to an outer surface of the bottom wall 12a of the base 12 by means of screws. The printed circuit board controls operations of the spindle motor 18, VCM 24, and magnetic heads 17 through the board unit 21. A circulation filter 23 configured to capture dust caused in the housing 10 by the operations of the movable parts is provided on the sidewall of the base 12, and is positioned outside the magnetic disks 16. Further, a breather filter 15 configured to capture dust from the air flowing into the housing 10 is provided on the sidewall of the base 12.

As shown in FIG. 1, the HSA 22 comprises a freely rotatable bearing unit 28, four arms 32 attached to the bearing unit 28 in a laminated state, head gimbal assemblies (HGAs) 30 extending from the arms, and spacer rings (not shown) arranged between the arms in a laminating manner. Each of the arms 32 is formed of, for example, stainless steel, aluminum or the like into an elongate plate-shape. The arm 32 includes a distal-end portion on the extended end side, and a seating face for swaging with a swaging hole (not shown) is formed at the distal-end portion. The bearing unit 28 includes a pivot shaft erected on the bottom wall 12a of the base 12 near the outer circumferential edge of the magnetic disks 16, and cylindrical sleeve rotatably supported on the pivot shaft by a bearing.

Figure 2:
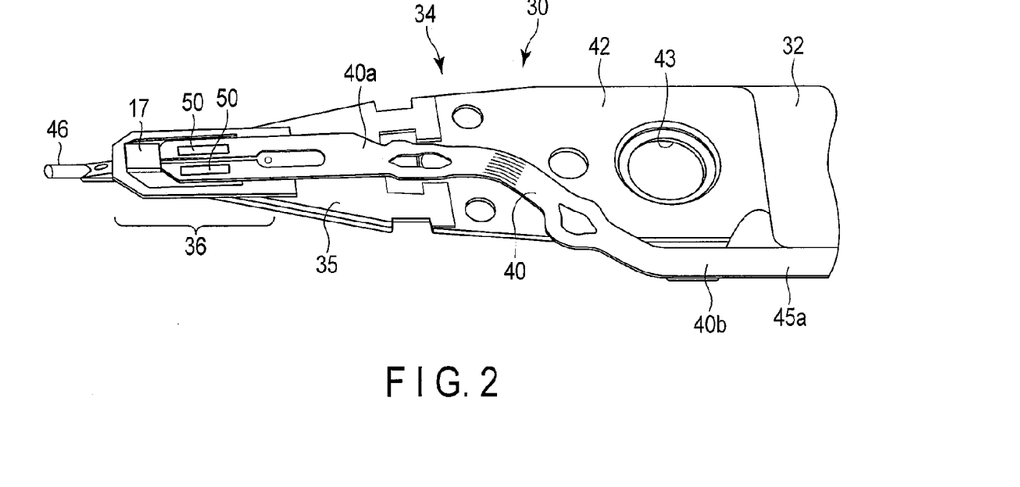
FIG. 2 is a perspective view showing a head gimbal assembly of the HDD.

FIG. 2 is a perspective view showing the HGA 30. As shown in FIG. 1 and FIG. 2, each HGA 30 includes a suspension 34 extending from the arm 32, and magnetic head 17 supported on an extended end of the suspension.

The suspension 34 includes a rectangular base plate 42 formed of a metallic plate with a thickness of several hundred microns, and load beam 35 with a shape of an elongate leaf spring, and formed of a metallic plate with a thickness of several tens of microns. The load beam 35 is arranged in such a manner that a proximal-end portion thereof overlaps the distal-end portion of the base plate 42. By welding the proximal-end portion of the load beam 35, and distal-end portion of the base plate 42 together at a plurality of positions, the load beam 35 is fixed to the base plate 42. The proximal-end portion of the load beam 35 has a width substantially equal to a width of the base plate 42. An elongate rod-shaped tab 46 is provided at the distal end of the load beam 35 in a protruding manner.

The base plate 42 includes, at a proximal-end portion thereof, a circular opening, and annular protrusion 43 positioned around the opening. By fitting the protrusion 43 of the base plate 42 in the circular swaging hole (not shown) formed in the seating face for swaging provided on the arm 32, and swaging the protrusion 43, the base plate 42 is fastened to the distal-end portion of the arm 32.

The HGA 30 comprises a pair of piezoelectric (PZT) elements 50, and an elongate belt-shaped flexure (conductive trace member) 40 configured to transmit a recording signal, reproduction signal, and a drive signal of the piezoelectric element. As shown in FIG. 2, in the flexure 40, a distal-end-side portion 40a thereof is attached to the load beam 35 and base plate 42 at their top surfaces, and latter-half portion (extension portion) 40b thereof extends off the side edge of the base plate 42, and extends along the side edge of the arm 32. Further, a connection end portion of the flexure 40 positioned at a distal end of the extension portion 40b is connected to a main FPC 21b to be described later.

The distal-end portion of the flexure 40 positioned on the distal-end portion of the load beam 35 constitutes a gimbal portion 36, and the magnetic head 17 and piezoelectric elements 50 are mounted on the gimbal portion 36. The magnetic head 17 includes a slider formed in a substantially rectangular column, and recording element and reproducing element provided on the slider. The magnetic head 17 is mounted on the gimbal portion 36, and is supported by the load beam 35 through the gimbal portion 36. The pair of piezoelectric (PZT) elements 50 is attached to the gimbal portion 36, and is positioned on the distal-end portion of the load beam 35 in the vicinity of the magnetic head 17.

Figure 3:
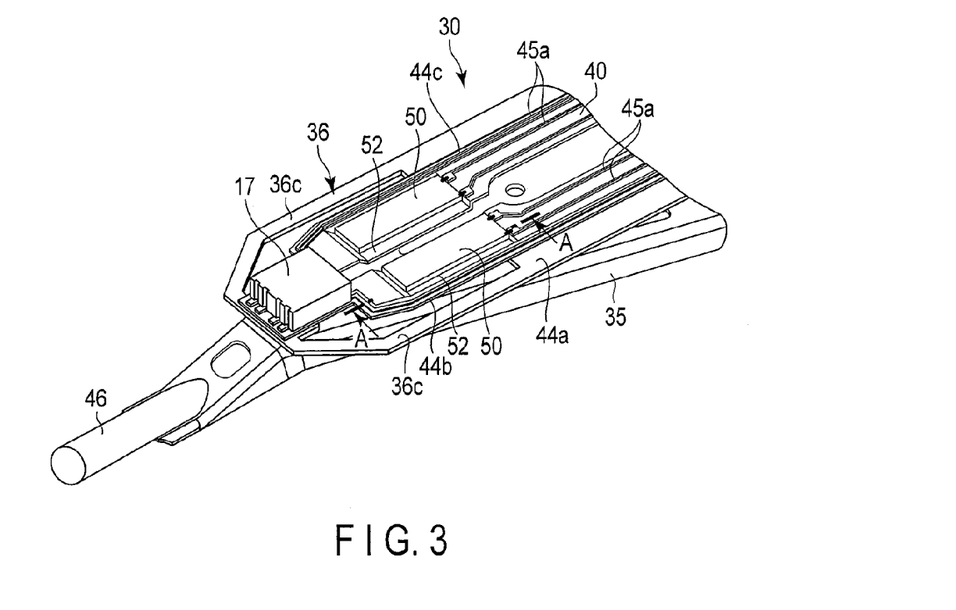
FIG. 3 is a perspective view showing a distal-end portion and gimbal-portion of the head gimbal assembly.
Figure 4:
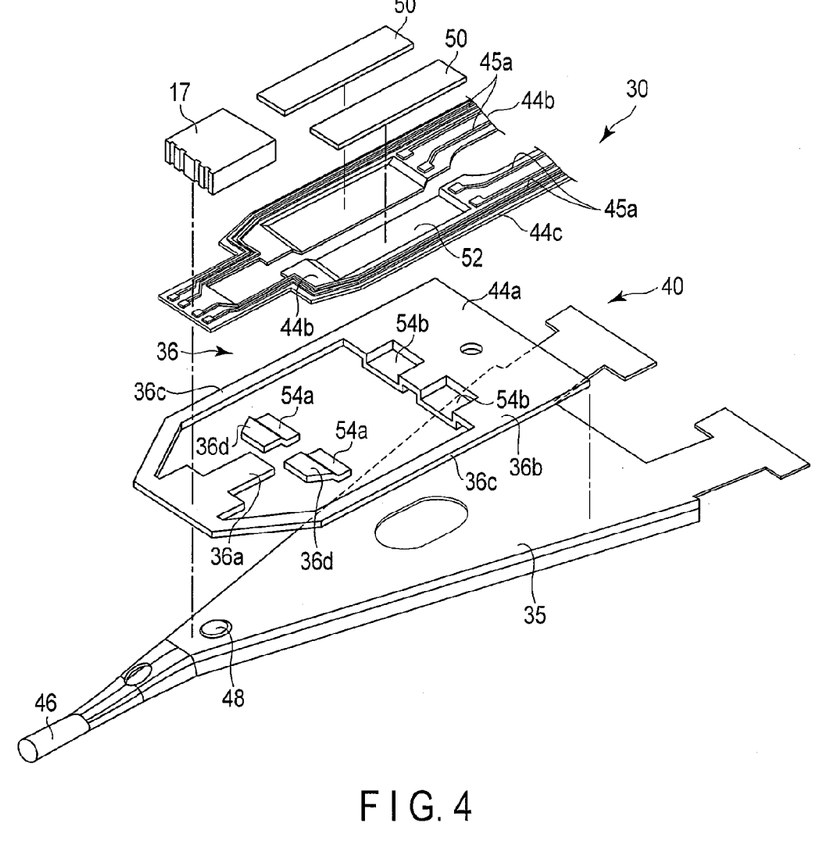
FIG. 4 is an exploded perspective view showing a magnetic head, piezoelectric elements, flexure, and load beam of the head gimbal assembly.
Figure 5:
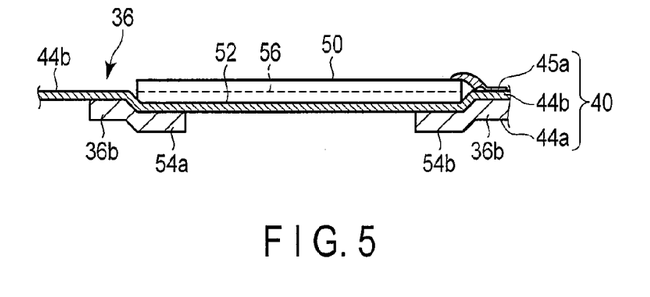
FIG. 5 is a cross-sectional view of a piezoelectric mounting portion along line A-A of FIG. 3.

FIG. 3 is a perspective view showing the magnetic head portion of the HGA 30 in an enlarged manner, FIG. 4 is an exploded perspective view showing the magnetic head, piezoelectric elements, flexure, and load beam of the HGA, and FIG. 5 is a cross-sectional view showing a piezoelectric mounting portion.

As shown in FIGS. 2 to 5, the flexure 40 includes a thin metallic plate (lining layer) 44a formed of stainless steel or the like, and serving as a base, insulating layer 44b formed on the thin metallic plate, conductive layer (trace pattern) 44c formed on the insulating layer, and constituting a plurality of traces 45a, and protective layer (insulating layer) (not shown) covering the conductive layer. The flexure 40 constitutes an elongate belt-shaped laminated plate. The distal-end-side portion 40a of the flexure 40 is attached to the surfaces of the load beam 35 and base plate 42 at the thin metallic plate 44a side thereof by adhering or pivot welding.

In the gimbal portion 36 of the flexure 40, the thin metallic plate 44a includes a rectangular tongue portion 36a positioned on the distal end side, rectangular proximal-end portion 36b positioned on the proximal end side, and a pair of right and left link portions 36c extending from the tongue portion to the proximal-end portion. A pair of island-shaped support portions 36d is provided in the space between the tongue portion 36a and proximal-end portion 36b. In the gimbal portion 36, the insulating layer 44b and conductive layer 44c extend to the distal end side of the tongue portion 36a through positions on the proximal-end portion 36b, space part, and pair of support portions 36d.

The magnetic head 17 is fixed to the tongue portion 36a through the insulating layer 44b by an adhesive. The proximal-end portion 36b of the thin metallic plate 44a is fixed to the load beam 35 by welding or the like. A substantially central part of the tongue portion 36a abuts on a dimple (support protrusion) 48 provided at the distal-end portion of the load beam 35 in a protruding manner. The tongue portion 36a and magnetic head 17 can be rocked or rolled by the elastic deformation of the link portions 36c.

Two concaves 52 with bottoms are formed at the gimbal portion 36 as mounting portions of the piezoelectric elements 50. Each of the concaves 52 is concaved toward the thin metallic plate 44 side, i.e., the load beam 35 side, and is formed into an elongate rectangular shape extending in the longitudinal direction of the load beam 35. The two concaves 52 are provided side by side substantially in parallel with each other. In this embodiment, a step portion 54a one step lower toward the load beam 35 side is formed on each of the support portions 36d of the thin metallic plate 44a, and two step portions 54b each of which is one step lower toward the load beam 35 side are formed in the proximal-end portion 36b. The pairs of step portions 54a and 54b are opposed to each other in the longitudinal direction of the gimbal portion with the space part held between them. These step portions 54a and 54b are formed by, for example, press work, offset bending work or the like. Further, part of the insulating layer 44b is bent toward the thin metallic plate 44a side along the pairs of step portions 54a and 54b, and is stretched between each pair of step portions 54a and 54b. Thereby, the concave portions 52, and bottoms of the concave portions are formed.

Each of the piezoelectric elements 50 is formed into an elongate rectangular shape, and is configured to expand/contract in the longitudinal direction thereof. The piezoelectric elements 50 are fixed in the concave portions 52 of the gimbal portion 36 by an adhesive or the like. That is, each of the piezoelectric elements 50 is fixed to the insulating layer constituting the bottom of the concave portion 52. A length of the piezoelectric element 50 in the longitudinal direction is made substantially equal to a length of the concave portion 52. Both ends of each of the piezoelectric elements 50 in the longitudinal direction are opposed to, and are adjacent to both ends of each of the concave portions 52 in the longitudinal direction, and are further placed on the step portions 54a and 54b to be supported on these step portions 54a and 54b. Each of the piezoelectric elements 50 is arranged in such a manner that the longitudinal direction thereof is parallel to the longitudinal direction of the load beam 35 and flexure 40. Thereby, the two piezoelectric elements 50 are arranged side by side in parallel to each other.

As shown in FIG. 5, a depth of each of the concave portions 52 is set in accordance with a thickness of each of the piezoelectric elements 50. That is, the depth of the concave portion 52 is set in such a manner that a neutral plane 56 positioned at a center of the piezoelectric element 50 in the thickness direction thereof is close to the thin metallic plate 44a. In this embodiment, the concave portion 52 is formed so that the depth thereof is substantially equal to the thickness of the insulating layer 44b, conductive layer, and protective layer. Thereby, the neutral plane 56 of the piezoelectric element 50 arranged in the concave portion 52 is positioned at substantially the same height as the surface of the insulating layer 44b. Further, the configuration in which the concave portion 52 is formed deeper in such a manner that the neutral plane 56 of the piezoelectric element 50 is positioned at the same height as the surface of the thin metallic plate 44a or a center thereof in the thickness direction may be employed.

As shown in FIGS. 3 to 5, parts of the traces 45a of the flexure 40 are traces configured to transmit a recording/reproduction signal to the magnetic head 17, and these traces extend to the magnetic head 17, and include electrode pads at their extended ends. These electrode pads, and the recording element and reproducing element of the magnetic head are electrically connected to each other by solder or a conductive adhesive such as silver paste. Further, parts of the traces 45a of the flexure 40 are traces configured to transmit a drive signal to each of the piezoelectric elements 50, and these traces extend to a position close to each of the piezoelectric elements 50, and include electrode pads at their extended ends. These electrode pads, and piezoelectric elements 50 are electrically connected to each other by solder or a conductive adhesive such as silver paste. It should be noted that the plurality of traces 45a extend to a position on the connection end side of the flexure along the flexure 40, and are connected to connection pads (not shown) provided at the connection end portion.

Figure 6:
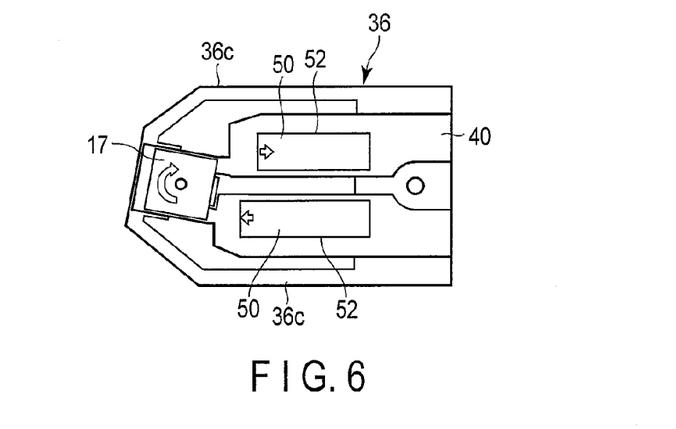
FIG. 6 is a plan view schematically showing the state where the magnetic head is driven by the piezoelectric elements.

Each of the piezoelectric elements 50 expands/contracts in the longitudinal direction of the flexure 40 as shown by an arrow in FIG. 6 by application of a voltage thereto. By driving the two piezoelectric elements 50 in directions in which the elements 50 expand/contract opposite to each other, it is possible to rock the tongue portion 36a of the gimbal portion 36 through the flexure 40, and displace the magnetic head 17 in the seek direction.

As shown in FIG. 1, the HSA 22 comprises a support frame extending from the bearing unit 28 in a direction opposite to the arm 32, and a voice coil constituting part of the VCM 24 is embedded in the support frame. In a state where the HSA 22 configured as described above is installed on the base 12, the bearing unit 28 is vertically arranged substantially parallel to the spindle of the spindle motor 18 with a lower end portion of the shaft of the bearing unit 28 fixed to the base 12.

Each of the magnetic disks 16 is positioned between two HGAs 30. When the HDD is operated, the magnetic heads 17 attached to the suspensions 34 are respectively opposed to the top surface and rear surface of the magnetic disk 16, and are positioned on both sides of the magnetic disk 16. The voice coil fixed to the support frame is positioned between a pair of yokes 37 fixed on the base 12, and constitutes the VCM 24 together with the yokes, and a magnet (not shown) fixed to one of the yokes.

As shown in FIG. 1, the board unit 21 includes a main body 21a formed of a flexible printed circuit board, and the main body 21a is fixed to the bottom wall 12a of the base 12. On the main body 21a, electronic components (not shown) such as a head amplifier, and the like are mounted. A connector (not shown) configured to connect the main body 21a to the printed circuit board is mounted on the underside of the main body 21a.

The board unit 21 includes a main flexible printed circuit board (main FPC) 21b extending from the main body 21a. An extended end of the main FPC 21b constitutes a connection end portion, which is fixed to a portion close to the bearing unit 28 of the HSA 22. The flexure 40 of each of the HGAs 30 is mechanically and electrically connected to the connection end portion of the main FPC 21b. Thereby, the board unit 21 is electrically connected to the magnetic head 17 and piezoelectric elements 50 through the main FPC 21b and flexure 40.

As shown in FIG. 1, the ramp load mechanism 25 is provided with a ramp 47 arranged outside the magnetic disks 16 on the bottom wall 12a of the base 12, and tab 46 (see FIGS. 2 to 4) extending from the distal end of each of the suspensions 34. When the HSA 22 is rotated about the bearing unit 28, and the magnetic head 17 moves to the retraction position outside the magnetic disks 16, each tab 46 is engaged with the ramp surface formed on the ramp 47 and, is thereafter raised by the inclination of the ramp surface. Thereby, the magnetic head 17 is unloaded from the magnetic disk 16, and is held at the retraction position.

According to the HDD and HGA 30 configured as described above, the piezoelectric elements 50 are attached to the gimbal portion 36 of the flexure 40, and a voltage is applied to the piezoelectric elements 50 through the flexure 40, whereby it is possible to displace the magnetic head 17 attached to the gimbal portion in the seek direction. Thereby, it becomes possible to minutely control the position of the magnetic head 17, and improve the positioning accuracy of the magnetic head by controlling the voltage to be applied to the piezoelectric elements 50.

Further, the step portions are provided in the mounting portion of the gimbal portion to which the piezoelectric elements 50 are adhered by offset work or the like to thereby form the concave portions along the step portions, and the piezoelectric element is attached to the inside of each of the concave portions, whereby the neutral plane 56 positioned at the center of the piezoelectric element 50 in the thickness direction thereof is made close to the thin metallic plate of the flexure 40. It is possible to make the neutral plane 56 of the piezoelectric element close to the center of the flexure in the thickness direction, in particular, to a position in the thickness direction at which the rigidity is high. Accordingly, it is possible to prevent the stroke of expansion or contraction of each of the piezoelectric elements obtained by the voltage application from escaping in a direction curved in the thickness direction, and transmit the displacement stroke of each of the piezoelectric elements as it is in the surface direction of the flexure 40. Thereby, it is possible to improve the stroke per unit voltage without changing the characteristics or the size of the piezoelectric element, and obtain a sufficient displacement control amount of the magnetic head.

Next, HGAs according to another embodiment and modification examples will be described. In another embodiment and the modification examples, portions identical to the first embodiment described above are denoted by identical reference symbols, and detailed descriptions of them are omitted.

Second Embodiment

Figure 7:
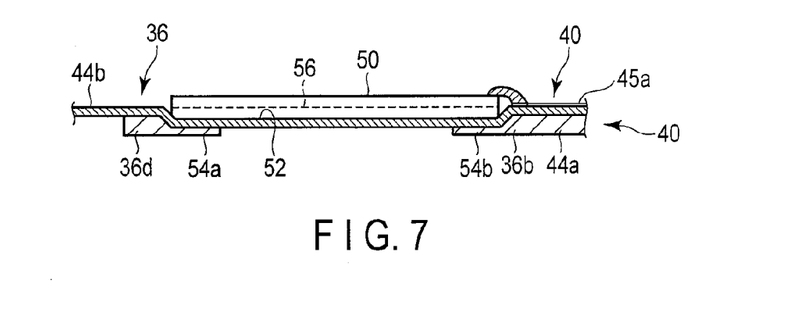
FIG. 7 is a cross-sectional view showing a piezoelectric element mounting portion of a head gimbal assembly according to a second embodiment.

FIG. 7 is a cross-sectional view showing a piezoelectric element, and piezoelectric element mounting portion of an HGA 30 according to a second embodiment. According to this embodiment, in a gimbal portion 36, a predetermined region on the top surface side (insulating layer side) of a thin metallic plate (lining layer) 44a is etched and removed into a depth of about 5 to 10 µm in the thickness direction, whereby step portions 54a and 54b one step lower toward the load beam side in the thickness direction of the thin metallic plate are formed. Further, part of an insulating layer 44b is bent toward the thin metallic plate 44a side along the pair of step portions 54a and 54b, and is stretched between the pair of step portions 54a and 54b. Thereby, a concave portion 52, and bottom (seating face) of the concave portion are formed. The piezoelectric element 50 is fixed in the concave portion 52 of the gimbal portion 36 by an adhesive or the like. That is, the piezoelectric element 50 is fixed to the insulating layer 44b constituting the bottom of the concave portion 52.

In the second embodiment configured as described above too, it is possible to make a neutral plane 56 of the piezoelectric element 50 close to a center of a flexure 40 in the thickness direction thereof, and obtain a function and advantage identical to the first embodiment described previously. Further, in the second embodiment, the step portions 54a and 54b do not protrude toward the load beam side, and hence it becomes possible to prevent the step portions and the load beam from coming into contact with each other.

(First Modification)

Figure 8:
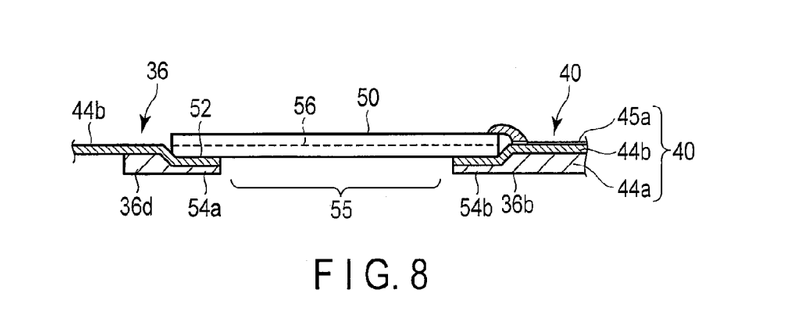
FIG. 8 is a cross-sectional view showing a piezoelectric element mounting portion of a head gimbal assembly according to a first modification.

FIG. 8 is a cross-sectional view showing a piezoelectric element, and piezoelectric element mounting portion of an HGA 30 according to a first modification. According to the first modification example, a portion 55 of the insulating layer 44b constituting the bottom of the concave portion 52 positioned between the pair of step portions 54a and 54b, and acting as resistance to the expansion/contraction operation of the piezoelectric element 50 in the second embodiment described previously is removed. By employing such a configuration, the expansion/contraction amount of the piezoelectric element 50 is increased, and it is possible to displace the magnetic head 17 more easily and smoothly through the flexure 40.

(Second Modification)

Figure 9:
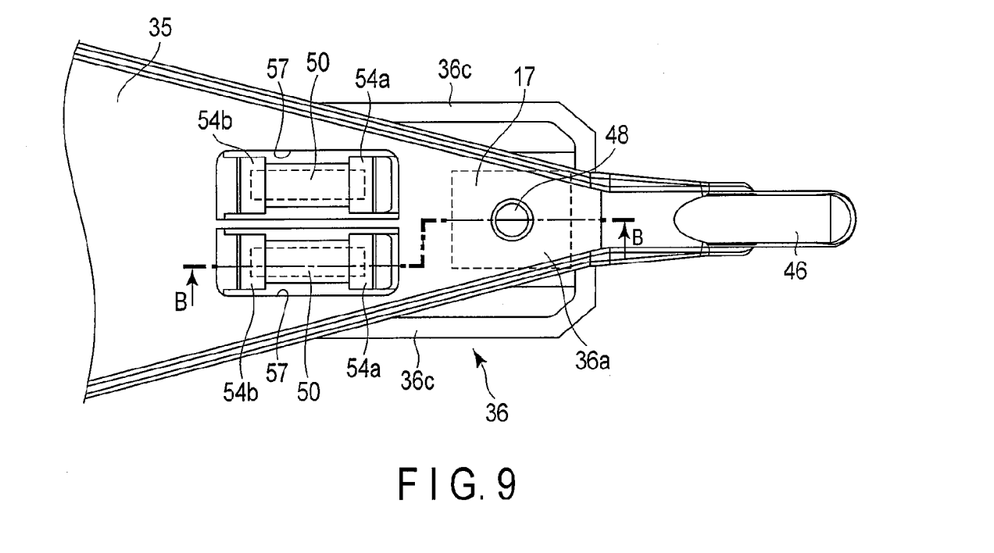
FIG. 9 is a plan view showing a distal-end portion of a head gimbal assembly according to a second modification.
Figure 10:
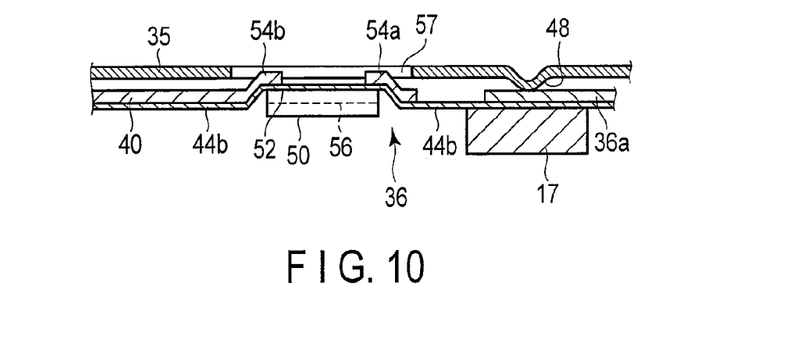
FIG. 10 is a cross-sectional view of the distal-end portion of the head gimbal assembly along line B-B of FIG. 9.

FIG. 9 is a plan view showing a load beam and gimbal portion of an HGA 30 according to a second modification example. FIG. 10 is a cross-sectional view of the load beam, and gimbal portion along line B-B of FIG. 9. As shown in FIG. 9 and FIG. 10, according to the second modification example, a configuration in which, in the load beam 35, an opening 57 is provided in an area opposed to step portions 54a and 54b of the gimbal portion 36 to thereby avoid contact between the mounting face (concave portion bottom surface) and load beam 35 may also be employed.

According to such a configuration, it becomes possible to prevent the step portions 54a and 54b, and the load beam 35 from coming into contact with each other, and displace the gimbal portion 36 more easily and smoothly. Further, it becomes possible to form the concave portion 52 more deeply, and hence it becomes possible to make the neutral plane 56 of the piezoelectric element 50 closer to the center of the flexure 40 in the thickness direction.

Third Embodiment

Figure 11:
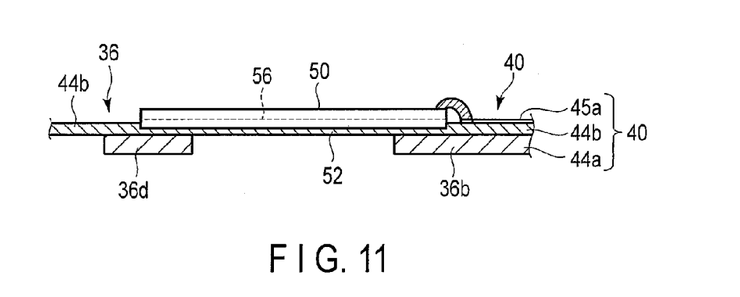
FIG. 11 is a cross-sectional view showing a piezoelectric element mounting portion of a head gimbal assembly according to a third embodiment.

FIG. 11 is a cross-sectional view showing a piezoelectric element, and piezoelectric element mounting portion of an HGA 30 according to a third embodiment. According to this embodiment, in a gimbal portion 36, a lined thin metallic plate 44a and a pair of supporting portions 36d are formed into a flat sheet. A predetermined region on the top surface side (wiring 45a side) of an insulating layer 44b is etched and removed into a depth of about a few µm in the thickness direction, whereby a concave portion (step portion) 52 and a bottom (seating face) of the concave portion are formed one step lower toward the load beam side in the thickness direction of the insulating layer 44b. Note that, the concave portion 52 is not necessarily formed by etching. For example, the insulating layer 44b may be prepared as a plurality of insulating layers laminated with each other with a step portion originally formed therein to define the concave portion 52.

The piezoelectric element 50 is fixed in the concave portion 52 of the gimbal portion 36 by an adhesive or the like. That is, the piezoelectric element 50 is fixed to the insulating layer 44b constituting the bottom of the concave portion 52.

In the third embodiment configured as described above, it is possible to make a neutral plane 56 of the piezoelectric element 50 close to a center of a flexure 40 in the thickness direction thereof, and obtain a function and advantage identical to the first embodiment described previously. Further, in the third embodiment, the concave portion (step portions) does not protrude toward the load beam side, and hence it becomes possible to prevent the step portions and the load beam from coming into contact with each other.

Figure 12:
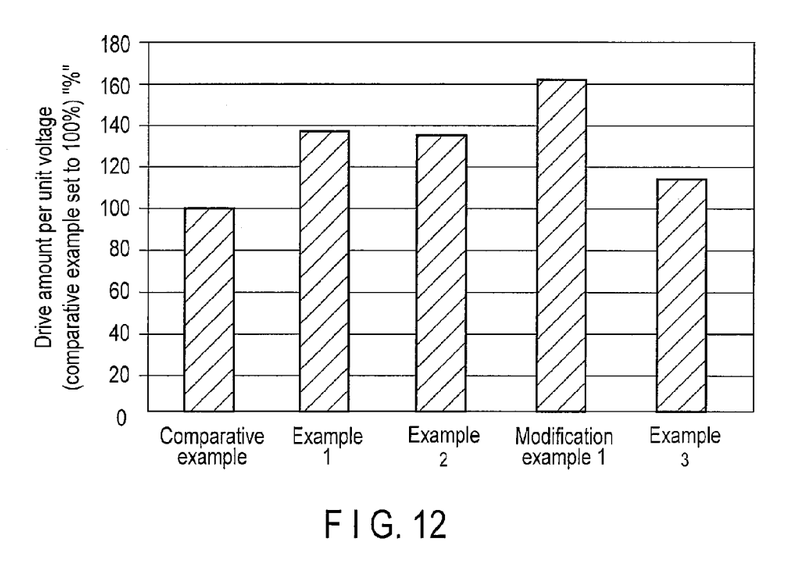
FIG. 12 is a graph showing results obtained by simulating a drive amount of the magnetic head per unit voltage to be applied to the piezoelectric element by using finite-element analysis with respect to the first embodiment, second embodiment, third embodiment, first modification example, and comparative example.

FIG. 12 shows results obtained by simulating a drive amount of the magnetic head per unit voltage to be applied to the piezoelectric element by using finite-element analysis with respect to the embodiments described previously, and first modification example. Further, in FIG. 12, a simulation result of an HGA in which the piezoelectric elements are directly provided on the surface of the flexure is shown as a comparative example.

In the flexure 40 used in each of the simulations, the thin metallic plate for lining is a stainless plate with a thickness of 18 μm, the insulating layer 44b has a thickness of 8 μm, and the conductive layer 44c has a thickness of 12 μm. The thickness of the piezoelectric element 50 is 10 μm. Further, the voltage application condition for the piezoelectric elements 50 is identical in each of the simulations.

As shown in FIG. 12, it can be seen that in each of the first, second, and third embodiments, and first modification example, the drive amount of the magnetic head is greater than the comparative example. Accordingly, in each of the first, second, and third embodiments, and first modification example, it is possible to increase the drive amount of the magnetic head in the gimbal-drive HGA, improve the magnetic head positioning capability, and reduce the size of the piezoelectric element itself, whereby it becomes possible to further reduce the cost, and further enhance space saving of the gimbal portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiments described previously, although plate-shaped arms independent of each other have been used as the arms of the HSA, the arms of the HSA are not limited to these, and a plurality of arms, and bearing sleeve formed integral with each other into a so-called E-block form may also be employed. The magnetic disk is not limited to that of 2.5 in., and a magnetic disk of another size may be employed. The number of magnetic disks is not limited to two, one or three or more magnetic disks may be used, and it is advisable to increase/decrease the number of HGAs according to the number of magnetic disks to be installed.

What is claimed is:

1. A head gimbal assembly comprising:
    a load beam;
    a base plate fixed to a proximal-end portion of the load beam;
    a flexure comprising a thin metallic plate, an insulating layer on the thin metallic plate, and a conductive layer on the insulating layer and including a plurality of traces, the flexure being an elongate belt-shape and attached to the load beam and the base plate at the thin metallic plate side thereof;
    a gimbal portion formed of a distal-end portion of the flexure positioned on a distal-end portion of the load beam;
    a magnetic head attached to the gimbal portion, and electrically connected to the traces of the flexure;
    a concave portion formed in the gimbal portion, and concaved toward the thin metallic plate side; and
    a piezoelectric element arranged in the concave portion, fixed on a bottom of the concave portion, and configured to expand and to contract in a longitudinal direction of the flexure by application of a voltage thereto,
    wherein the thin metallic plate comprises a step portion formed by bending a part of the thin metallic plate in the thickness direction or formed by removing part of the thin metallic plate in the thickness direction by etching.

2. The head gimbal assembly of claim 1, wherein in the gimbal portion, the thin metallic plate comprises a pair of step portions including said step portion, bent toward the load beam side in a thickness direction, and opposed to each other in the longitudinal direction of the flexure with a space between the step portions, and a part of the insulating layer is bent toward the thin metallic plate side along the pair of step portions, is stretched between the pair of step portions, and constitutes the concave portion, and the bottom of the concave portion.

3. The head gimbal assembly of claim 2, wherein both end portions of the piezoelectric element in a longitudinal direction are supported on the pair of step portions through the insulating layer.

4. The head gimbal assembly of claim 2, wherein a part of the insulating layer is formed to overlap the pair of step portions, and is removed between the pair of step portions.

5. The head gimbal assembly of claim 2, wherein the step portions of the thin metallic plate are formed by bending a part of the thin metallic plate in the thickness direction.

6. The head gimbal assembly of claim 2, wherein the step portions of the thin metallic plate are formed by removing part of the thin metallic plate in the thickness direction by etching.

7. The head gimbal assembly of claim 1, wherein a neutral plane extending through a center of the piezoelectric element in a thickness direction is positioned inside the concave portion.

8. A disk device comprising:
    a disk recording medium;
    a drive motor configured to support and rotate the recording medium; and
    the head gimbal assembly according to claim 1 supporting a magnetic head to be movable with respect to the recording medium, the magnetic head being configured to subject the recording medium to information processing.

9. The disk device of claim 8, wherein in the gimbal portion, the thin metallic plate comprises a pair of step portions including said step portion, bent toward the load beam side in a thickness direction, and opposed to each other in the longitudinal direction of the flexure with a space between the step portions, and a part of the insulating layer is bent toward the thin metallic plate side along the pair of step portions, is stretched between the pair of step portions, and constitutes the concave portion, and the bottom of the concave portion.

10. The disk device of claim 9, wherein both end portions of the piezoelectric element in a longitudinal direction are supported on the pair of step portions through the insulating layer.

11. The disk device of claim 9, wherein the step portions of the thin metallic plate are formed by bending a part of the thin metallic plate in the thickness direction.

12. The disk device of claim 9, wherein the step portions of the thin metallic plate are formed by removing part of the thin metallic plate in the thickness direction by etching.

13. The disk device of claim 9, wherein a part of the insulating layer is formed to overlap the pair of step portions, and is removed between the pair of step portions.

14. The disk device of claim 8, wherein a neutral plane extending through a center of the piezoelectric element in a thickness direction is positioned inside the concave portion.

15. A head gimbal assembly comprising:
    a load beam;

a base plate fixed to a proximal-end portion of the load beam;

a flexure comprising a thin metallic plate, an insulating layer on the thin metallic plate, and a conductive layer on the insulating layer and including a plurality of traces, the flexure being an elongate belt-shape and attached to the load beam and the base plate at the thin metallic plate side thereof;

a gimbal portion formed of a distal-end portion of the flexure positioned on a distal-end portion of the load beam;

a magnetic head attached to the gimbal portion, and electrically connected to the traces of the flexure;

a concave portion formed in a part of the insulating layer in the gimbal portion, and concaved toward the thin metallic plate side; and a piezoelectric element arranged inside the concave portion, fixed on a bottom of the concave portion, and configured to expand and to contract in a longitudinal direction of the flexure by application of a voltage thereto.

16. The head gimbal assembly of claim 15, wherein in the gimbal portion, the thin metallic plate comprises a pair of step portions bent toward the load beam side in a thickness direction, and opposed to each other in the longitudinal direction of the flexure with a space between the step portions, a part of the insulating layer is formed to overlap the pair of step portions, and is removed between the pair of step portions.

17. The head gimbal assembly of claim 15, wherein a neutral plane extending through a center of the piezoelectric element in a thickness direction is positioned inside the concave portion.

18. A disk device comprising:

a disk recording medium;

a drive motor configured to support and rotate the recording medium; and a head gimbal assembly supporting a magnetic head to be movable with respect to the recording medium, the magnetic head being configured to subject the recording medium to information processing, the head gimbal assembly comprising:

a load beam;

a base plate fixed to a proximal-end portion of the load beam;

a flexure comprising a thin metallic plate, an insulating layer on the thin metallic plate, and a conductive layer on the insulating layer and including a plurality of traces, the flexure being an elongate belt-shape and attached to the load beam and the base plate at the thin metallic plate side thereof;

a gimbal portion formed of a distal-end portion of the flexure positioned on a distal-end portion of the load beam;

a magnetic head attached to the gimbal portion, and electrically connected to the traces of the flexure;

a concave portion formed in a part of the insulating layer in the gimbal portion, and concaved toward the thin metallic plate side; and a piezoelectric element arranged inside the concave portion, fixed on a bottom of the concave portion, and configured to expand and to contract in a longitudinal direction of the flexure by application of a voltage thereto.

19. The head gimbal assembly of claim 18, wherein in the gimbal portion, the thin metallic plate comprises a pair of step portions bent toward the load beam side in a thickness direction, and opposed to each other in the longitudinal direction of the flexure with a space between the step portions, a part of the insulating layer is formed to overlap the pair of step portions, and is removed between the pair of step portions.

20. The head gimbal assembly of claim 18, wherein a neutral plane extending through a center of the piezoelectric element in a thickness direction is positioned inside the concave portion.

* * * * *